Patented Feb. 11, 1930

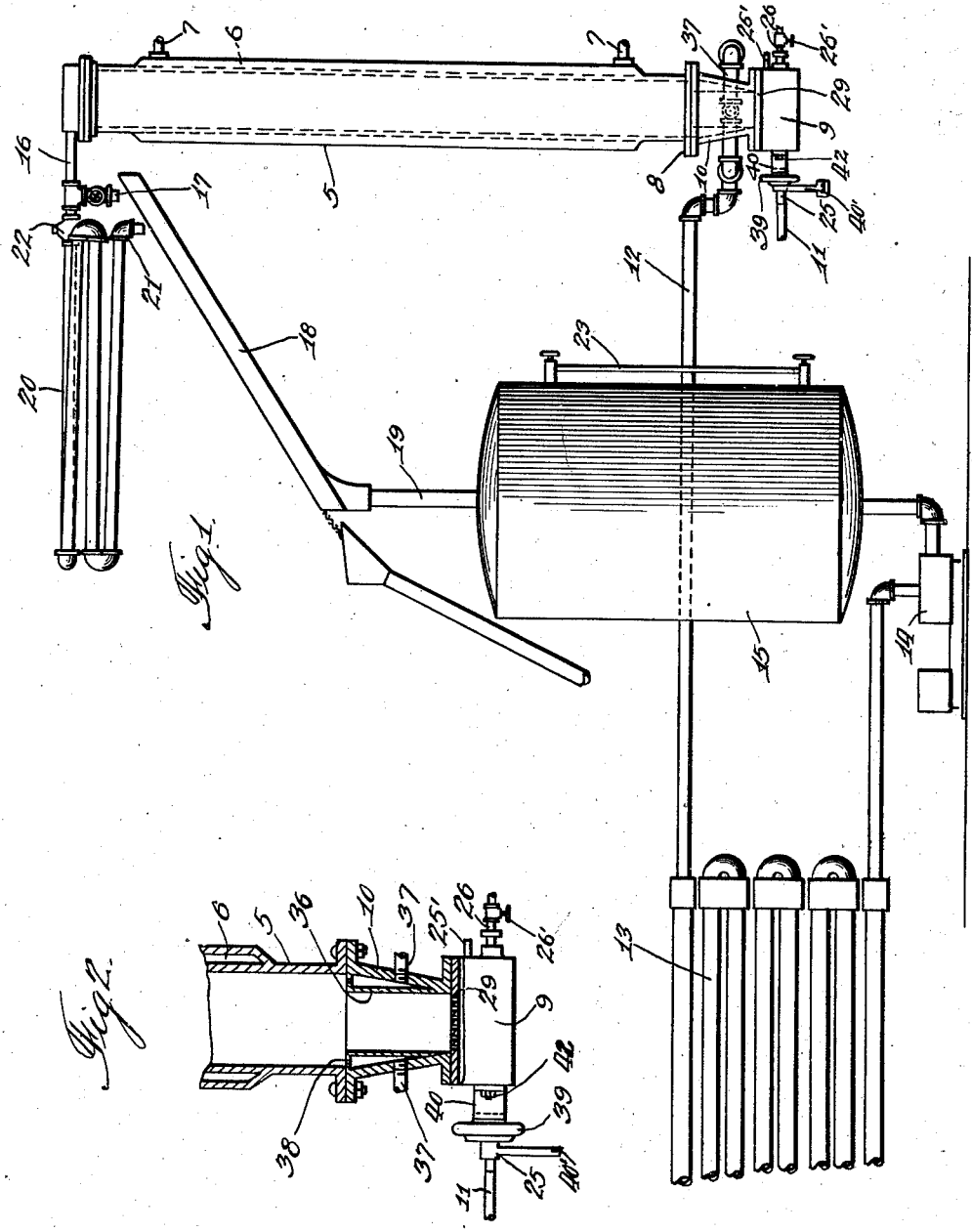

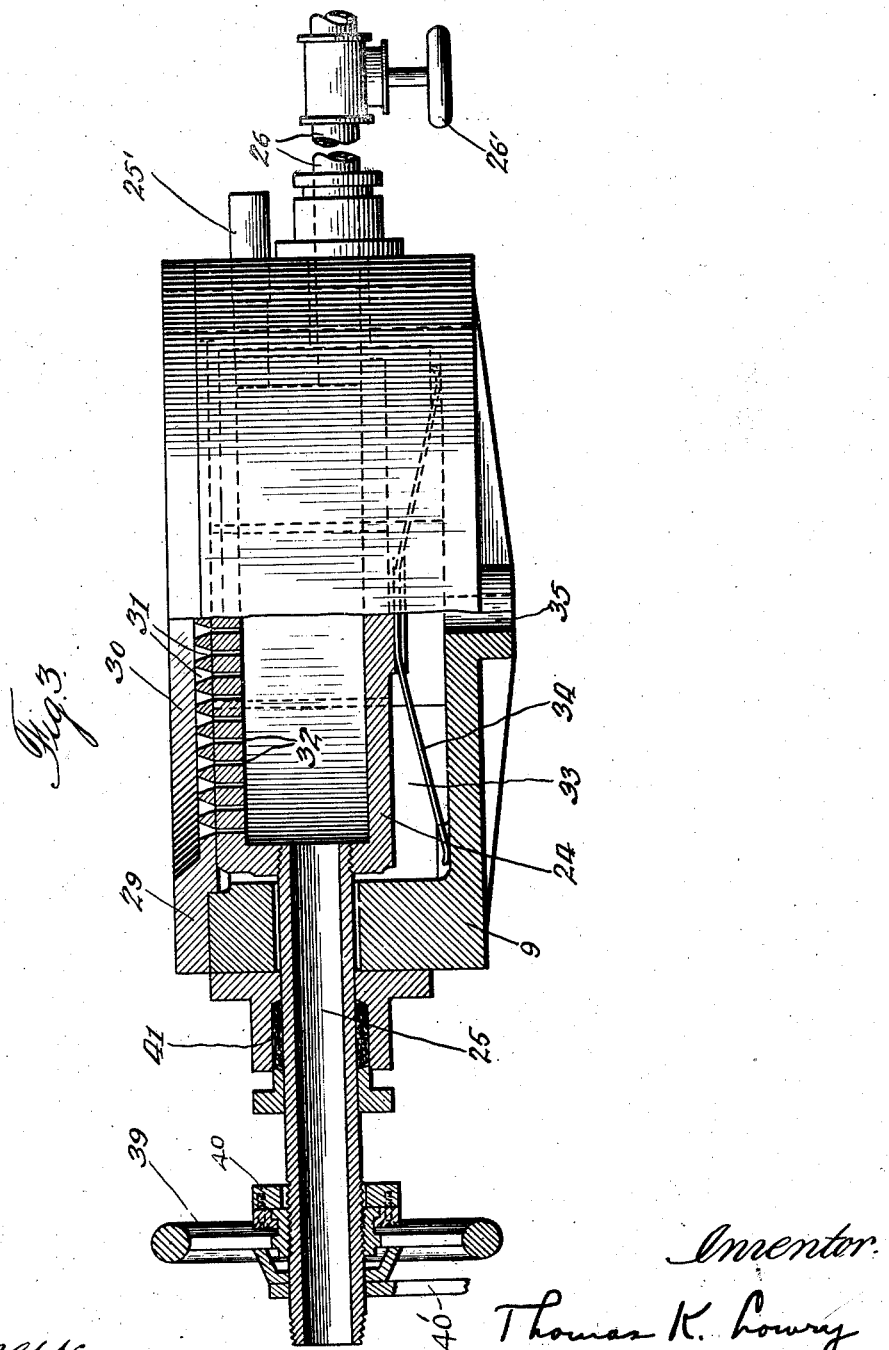

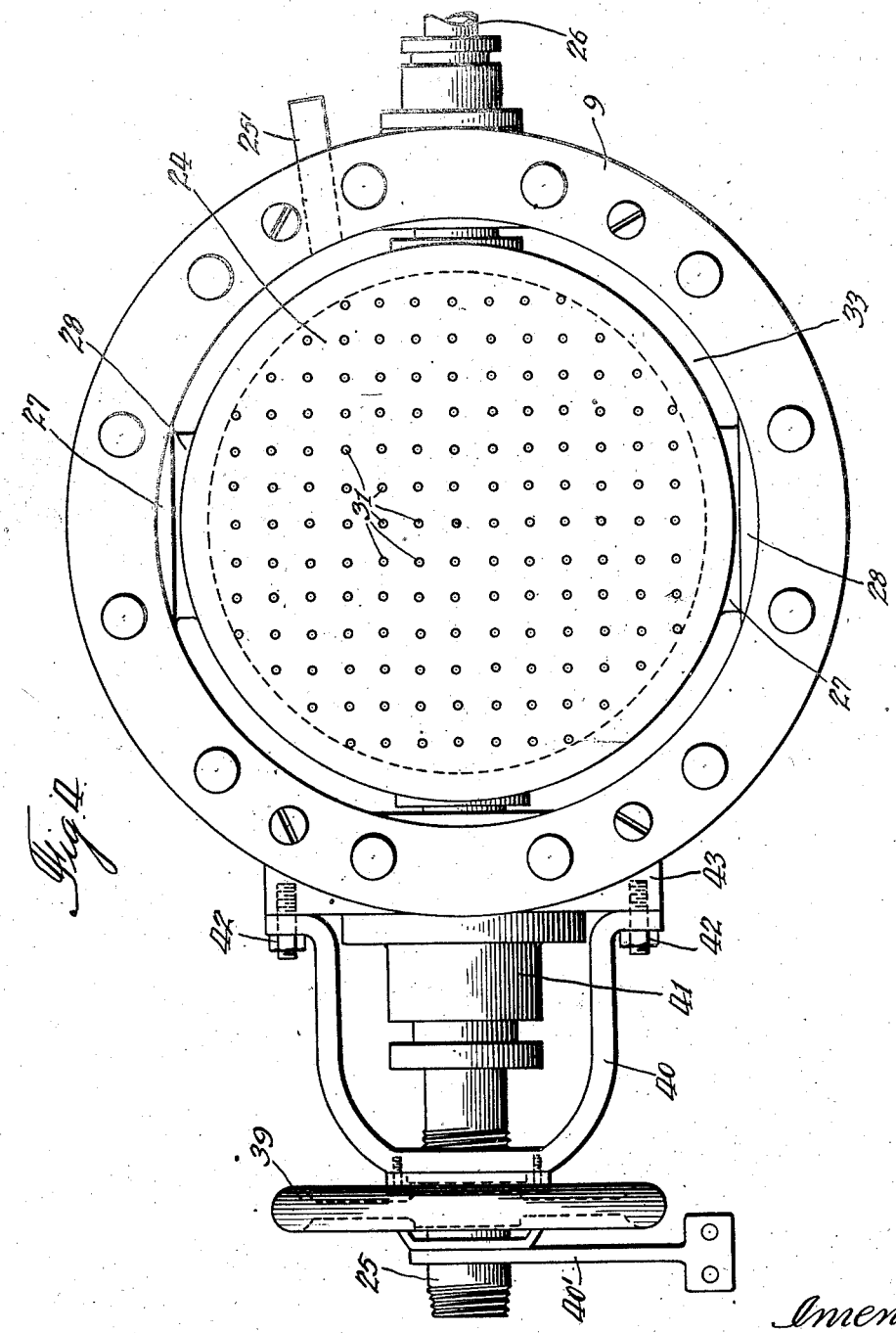

1,746,543

UNITED STATES PATENT OFFICE

THOMAS K. LOWRY, OF CHICAGO, ILLINOIS

METHOD AND APPARATUS FOR PRODUCING SOLIDIFIED GLOBULES FROM LIQUID GELATINOUS SUBSTANCES

Application filed January 25, 1928. Serial No. 249,488.

My invention relates to a new and improved method and apparatus for producing solidified globules from gelatinous substances.

The invention is particularly concerned with the production of so called pearl glue and in this connection, one of the important objects of the invention is to provide a method and apparatus with which pearl glue may be produced on a commercially practical basis, by using any one of several non-inflammable solidifying agents.

As heretofore practiced, in the manufacture of pearl glue, those methods which have any recognized standing from a commercially practical viewpoint, have all involved a fire hazard due to the highly inflammable nature of the liquid used as a solidifying medium. While there are several non-inflammable liquids suitable as solidifying mediums for the production of pearl glue, the inherent nature of these liquids, taking into account specific gravity and other characteristic qualities, are such that they have not been found satisfactory for use in connection with any heretofore known method or apparatus suitable for commercial purposes.

With my invention, I am able to use any of several non-inflammable liquids as a solidifying medium in a method and apparatus which meeets all the requirements of producing pearl glue on a commercially practical basis.

Another equally important feature of my invention, and where fire hazard is not a factor, is the possible use of my method and apparatus in connection with any of the inflammable solidifying mediums without sacrificing the commercial possibilities of the invention.

Other objects of the invention will appear hereinafter, the novel features and combinations being set forth in the appended claims.

In the accompanying drawings I have selected a practical embodiment of an apparatus as an illustration of the invention.

In said drawings:—

Fig. 1 is a diagrammatic view of the apparatus with the main parts shown in elevation;

Fig. 2 is a detail view in section of the end of the solidifying receptacle with the means for introducing the gelatinous substance and the liquid solidifying medium applied thereto;

Fig. 3 is a view in side elevation, and partly in section, of the means for introducing the gelatinous substance into the solidifying receptacle; and Fig. 4 is a plan view of the parts shown in Fig. 3, but with the nozzle plate removed.

Referring now to the drawings in detail, the apparatus preferably comprises a vertical solidifying receptacle 5 which is equipped for the greater part of its length with a cooling jacket 6 having an intake and outlet 7 so as to circulate a cooling liquid around the receptacle for maintaining the liquid solidifying medium circulating through the receptacle at a desired low temperature, preferably about 34° F. The lower end of the receptacle is made with an annular flange 8 for securing a fitting thereto for introducing the liquid solidifying medium and the gelatinous substance to be solidified in particles of substantially globular shape. This fitting for the most part comprises a housing 9 through which the liquid gelatinous substance is introduced into the receptacle 5 in the form of streamers. Disposed above this housing 9 is a cylindrical sleeve-like casing 10 through which the liquid solidifying medium is introduced into the receptacle. The liquid gelatinous substance may be supplied under the desired pressure from any suitable source through a pipe line 11 and the liquid solidifying medium may be supplied through a pipe line 12 from a series of temperature reduction pipes 13, preferably submerged in a brine tank. A pump 14 pumps the liquid solidifying medium from the tank 15 to the temperature reduction pipes 13 and to the pipe line 12. The opposite end of the receptacle 5 is equipped with a discharge comprising a pipe 16 having a valved discharging nozzle 17 which discharges upon the screened trough 18. The trough part of the screened trough 18 communicates with the tank 15 through the pipe 19 which enters the top of the tank 15. The screen part of the trough 18 may empty into a chute or other device suitable for collecting the solidified globules for drying as they are separated from the solidifying medium by the screened trough 18. Connected to the discharge pipe 16 in advance of the valved discharging nozzle 17 is a series of communicating pipe sections 20, the purpose of which is to give the gelatinous globules an opportunity to remain in the solidifying medium for a greater length of time when necessary to properly solidify them, than is possible by discharging them directly through the discharging nozzle 17. The end of the sections 20 also have a discharging nozzle 21 which discharges upon the screened trough 18. When it becomes desirable to run the liquid solidifying medium and the solidified globules through the sections 20, the valve for the discharging nozzle 17 may be closed and the valve 22 opened. The tank 15 may be equipped with a liquid level indicator 23 so as to show the level of the liquid solidifying medium contained in the tank.

According to my preferred method, I propose to employ some liquid solidifying medium having the inherent qualities of subdividing and converting the liquid gelatinous substance into solidified globules and to accomplish this in a practical, economical and convenient way, and preferably without fire hazard. Most any well-known liquid solidifying medium may be used in my method and apparatus, and as an example of those mediums which will give satisfactory results without fire hazard, I will refer to trichlorethylene, tetrachlorid of carbon, carbonbisulfid, and, where fire hazard is not a factor, benzyl-alcohol may be used, as well as benzene and other hydrocarbons. These liquids are suitable since they do not dissolve the gelatinous substance and they may also be cooled to the desired degree so as to realize a rapid solidifying result. With any of the liquid solidifying mediums just mentioned contained in the tank 15, the pump 14 may be operated to pump the liquid from the tank 15 through the temperature reduction pipes 13, then into the receptacle 5, through which it will be circulated and discharged at the top thereof through the nozzle 17, as an example, onto the screened trough 18 and back into the receptacle 5. This develops a continuous circulation of the liquid solidifying medium independently of the gelatinous substance to be solidified. The gelatinous substance, as above mentioned, is introduced from the pipe 11 into the receptacle 5 in the form of streamers where it comes into direct contact with the liquid solidifying medium circulating through the receptacle 5 and the streamers are sub-divided and solidified in the form of solid globules. The specific gravity of the liquid solidifying medium plays an important part in the operation of the process and from a fire hazard standpoint I would use a medium having a specific gravity greater than that of the gelatinous substance so as to encourage floating of the solidified globules so that they will float to the top of the receptacle 5 and be thus removed by flotation, so to speak. Of course, the floating of the solidified globules is not entirely relied upon, nor need it be, because the current created by the circulation of the liquid solidifying medium will urge the solidified globules toward the top of the receptacle so that they will be removed from the receptacle with the solidifying medium. Of course, if they do not float to a certain extent, the circulation perhaps would not be sufficient to carry them to the top of the receptacle. In any event, they are removed with the circulating solidifying medium and by the time they reach the discharge end of the receptacle they should be ready to be discharged upon the screened trough 18 so as to be separated from the solidifying medium and carried off where they may be dried in any suitable manner. The solidifying medium returns to the tank 15 for re-use. In the event that the temperature of the liquid solidifying medium in the receptacle 5 is not low enough to solidify the globules to the desired degree and it is found that they should circulate in the liquid solidifying medium for a longer length of time than is possible by discharging them through the nozzle 17, the valve thereof may be closed and the valve 22 opened. This will cause the liquid solidifying medium and the globules circulating therewith to traverse the pipe sections 20 before they are discharged through the nozzle 21.

The method and apparatus for introducing the gelatinous substance into the receptacle 5 is of considerable importance, because the substance is more or less difficult to handle owing to the nature of the same. To this end, I propose to equip the receptacle 5 with the housing 9 heretofore generally referred to. This housing 9 will contain a drum-like casing 24 which is slidably mounted within the housing upon the pipe 26 and with the pipe 25. The sides of the casing will be made with bosses 27 which lie flush against similar protrudances 28 on the inside of the housing 9. These contacting parts will permit the casing 24 to be moved in alinement with the pipes 25 and 26, but will arrest any movement attempting to tilt the casing sidewise, so to speak. Mounted upon the top of the housing 9 is a nozzle plate 29 which is made with a dished-out central area 30. This central area 30 is equipped with a multiplicity of nozzle jets 31 which communicate with a multiplicity of openings 32 in the top of the casing 24. The liquid gelatinous substance is introduced into the casing 24 through the pipe 25 and then flowed into the receptacle 5 through the openings 32 registering with the nozzle jets 31. The openings in the nozzle jets in this respect developing the desired multiplicity of streamers. In order to maintain the gelatinous substance in a heated state or at least in a warm state so as to prevent its solidifying prior to bring flowed into the receptacle 5, the housing 9 is made with a heating space 33 which surrounds the drum-like casing 24. In order to hold the top of the casing flush against the under side of the nozzle plate 29, a spring tension device 34 is mounted below the casing 24 so as to impart an upward thrust thereto. Steam for the heating space 33 may be introduced through the pipe 25' and returned through the pipe 35. In the event that the openings 32 or the nozzle jets 31 become clogged and it is desired to clean the same, the supply of gelatinous substance may be cut off and steam introduced through the pipe 25 from a connection close to the housing. In this way, the housing 24 and the openings 32 and jets 31 may be cleaned out and drained through the pipe 26. The pipe 26 has a cut-off valve 26' which is opened for this operation. It is to be noted that the end of the pipe 26 terminates within the housing 24 flush with the bottom thereof so as to provide complete drainage.

Surmounting the nozzle jets 31 in the nozzle plate 29 is an upright baffle tube 36 for protecting the streamers, the same being surrounded by the part 10 of the fitting and the flaring walls of the part 10 provide a space around the baffle tube into which the liquid solidifying medium is introduced from opposite sides through the pipes 37, the same, as previously stated, being connected to the pipe line 12. Communication between the space surrounding the baffle tube 36 and the receptacle 5 is established through a series of small openings 38 which distribute the incoming liquid solidifying medium evenly around the base of the receptacle.

In order to control the effective port area of the openings 32 and the jets 31, the casing 24 is mounted, as previously stated, to slide with respect to the nozzle plate 29 so as to increase or decrease the registering communication between the openings 32 and the nozzle jets 31, or effect a complete shut-off, if desirable. This sliding movement in the casing may be conveniently effected by a hand wheel 39 mounted on the pipe 25 between thrust brackets 40 and 40'. The pipe 25 does not rotate but is provided with external threads for the rotatable wheel 39 so that by turning the wheel 39 in one direction the casing 24 and pipe 25 will be moved to the left of its position shown in Fig. 3, and by turning the wheel 39 in the opposite direction it will be moved to the right of its position shown in Fig. 3. The housing 9 is provided with a suitable stuffing box 41 through which the pipe 25 slides and the thrust bracket 40 on one side of the wheel 39 is secured to the side of the housing by bolts 42 which secure it to the boss 43. The bracket 40' on the opposite side of the wheel is supported by a pedestal mounting. The pipe 25 slides through the thrust blocks of the brackets 40 and 40' which encircle it. The wash out pipe 26 which enters the casing from the opposite side has a sliding connection with the casing through the stuffing box to allow for the limited sliding movement of the casing.

It might be more fully explained that the difference in specific gravity between the solidifying medium and the gelatinous substance causes the streamers to break up into globules as they are forced into the receptacle. This same effect would be the result of circulating a liquid of less specific gravity across the surface of a perforated plate through which the gelatinous substance is delivered. An arrangement of this kind would operate under the same general principle as the apparatus illustrated. Briefly, it would simply be circulating the solidifying medium cross-wise or substantially so, to the introduction of the gelatinous substance, as compared to a vertical, or substantially vertical, circulation. As an example, the solidifying receptacle may be positioned horizontally instead of vertically and the gelatinous substance introduced at some location below the level of the liquid.

I would like to also point out the fact that any known liquid solidifying medium suitable for this purpose, and which is non-inflammable, has a specific gravity greater than that of gelatinous substance. I therefore have an opportunity of using the flotation step of my method with a wide variety of solidifying mediums.

Obviously those skilled in the art may make various changes in the construction of the apparatus and the specific method described without departing from the spirit and scope of the invention as defined by the appended claims, and I therefore do not wish to be limited to the precise embodiments of the apparatus shown.

Having thus fully described and shown an embodiment of my invention, what I desire to secure by Letters Patent of the United States, is:

1. The method of producing solidified globules from gelatinous substances, which consists in flowing the gelatinous substance under pressure into direct contact with a non-inflammable liquid solidifying medium having the inherent qualities of converting the substance into solidified globules.

2. The method of producing solidified globules from gelatinous substances, which consists in flowing the gelatinous substance in liquid form into direct contact with a liquid solidifying medium having the inherent qualities of converting the substance into solidified globules and recovering said globules by flotation.

3. The method of producing solidified globules from gelatinous substances, which consists in flowing the gelatinous substance in liquid form into direct contact with a circulating liquid solidifying medium having the inherent qualities of converting the substance into solidified globules.

4. The method of producing solidified globules from gelatinous substances, which consists in flowing the gelatinous substance in liquid form into direct contact with a circulating liquid solidifying medium having the inherent qualities of converting the substance into solidified globules and recovering said globules by flotation.

5. The method of producing solidified globules from gelatinous substances, which consists in circulating a liquid solidifying medium through a receptacle while flowing the gelatinous substance into said receptacle in direct contact with the liquid solidifying medium.

6. The method of producing solidified globules from gelatinous substances, which consists in circulating a liquid solidifying medium through a receptacle while flowing the gelatinous substance into said receptacle in direct contact with the liquid solidifying medium and removing by flotation the solidified globules thus formed.

7. The method of producing solidified globules from gelatinous substances, which consists in flowing the gelatinous substance in liquid form into a receptacle while circulating a liquid solidifying medium through the receptacle, removing the solidified globules from the receptacle with the circulating liquid solidifying medium, and separating the solidified globules from said solidifying medium exteriorly of the receptacle.

8. The method of producing solidified globules from gelatinous substances, which consists in flowing the gelatinous substance in liquid form into a receptacle while circulating a liquid solidifying medium through the receptacle, removing the solidified globules from the receptacle with the circulating liquid solidfying medium and returning said solidifying medium to the receptacle after separating the solidified globules therefrom.

9. The method of producing solidified globules from gelatinous substances, which consists in flowing the gelatinous substance in liquid form into a receptacle while circulating a liquid solidifying medium through the receptacle, removing the solidified globules from the receptacle with the circulating liquid solidifying medium and returning said solidifying medium to the receptacle after separating the solidified globules therefrom and lowering the temperature of said solidifying medium.

10. The method of producing solidified globules from gelatinous substances, which consists in flowing the gelatinous substance in the form of relatively small streamers into a receptacle while circulating a liquid solidifying medium through the receptacle.

11. The method of producing solidified globules from gelatinous substances, which consists in flowing the gelatinous substance in the form of relatively small streamers into a receptacle while circulating a liquid solidifying medium through the receptacle, removing the solidified globules from the receptacle with the circulating liquid solidifying medium and returning said solidifying medium to the receptacle after separating the solidified globules therefrom.

12. The method of producing solidified globules from gelatinous substances, which consists in flowing the gelatinous substance in the form of relatively small streamers into a receptacle while circulating a liquid solidifying medium through the receptacle and removing the solidified globules from the receptacle with the circulating liquid solidifying medium.

13. The method of producing solidified globules from gelatinous substances, which consists in flowing the gelatinous substance in the form of relatively small streamers into a receptacle while circulating a liquid solidifying medium through the receptacle, removing the solidified globules from the receptacle with the circulating liquid solidifying medium and returning said solidifying medium to the receptacle after separating the solidified globules therefrom and lowering the temperature of said solidifying medium.

14. The method of producing solidified globules from gelatinous substances, which consists in flowing the gelatinous substance in the form of relatively small streamers into one end of a vertically disposed receptacle, introducing a liquid solidifying medium into the same end of said receptacle and circulating it through the receptacle, removing the solidified globules of said gelatinous substance from the receptacle, with said circulating solidifying medium and returning said solidifying medium to the receptacle after removing the solidified globules therefrom.

15. An apparatus for producing solidified globules from gelatinous substances, comprising a solidifying receptacle, means for circulating a liquid solidifying medium through said receptacle, and means for introducing the gelatinous substance into the receptacle in the form of relatively small streamers.

16. An apparatus for producing solidified globules from gelatinous substances, comprising a solidifying receptacle, a housing communicating with said receptacle, a connection with said housing for supplying liquid gelatinous substances thereto, a multiplicity of relatively small openings between said housing and said receptacle for introducing the liquid gelatinous substance into the receptacle in the form of streamers, means for controlling the effective port area of said openings for varying the size of said streamers, and means for circulating a liquid solidifying medium through said receptacle.

17. An apparatus for producing solidified globules from gelatinous substances, comprising a solidifying receptacle, a housing communicating with said receptacle, a connection with said housing for supplying liquid gelatinous substances thereto, a multiplicity of relatively small openings between said housing and said receptacle for introducing the liquid gelatinous substance into the receptacle in the form of streamers, means for controlling the effective port area of said openings for varying the size of said streamers, means for circulating a liquid solidifying medium through said receptacle, comprising a pipe line communicating with the receptacle at one end thereof, a discharge at the opposite end of the receptacle, a tank communicating with said discharge, means for pumping the liquid solidifying medium from said tank as it is collected therein from said discharge, temperature reduction pipes through which said solidifying medium is pumped from said receptacle, and a communication between the temperature reduction pipes and the pipe line to said receptacle.

18. In an apparatus for producing solidified globules from liquid gelatinous substances, a solidifying receptacle having a cooling jacket around the same, a housing at one end of said receptacle, a multiplicity of valved openings between said housing and said receptacle for introducing liquid gelatinous substances into the receptacle in the form of streamers, a tank for containing a liquid solidifying medium, means for pumping said solidifying medium from said tank through temperature reduction pipes and circulating the same through said receptacle to solidify the gelatinous substance, a screened trough onto which the solidifying medium is discharged from the receptacle to separate the solidified globules therefrom, and a connection between said trough and said tank.

19. In an apparatus of the class described, a solidifying receptacle, and means at one end thereof for introducing liquid gelatinous substances in the form of streamers, comprising a drum-like casing, a housing for said casing having a heating space surrounding the casing, a nozzle plate on the housing having a multiplicity of nozzle jets, and a multiplicity of openings in the top of the casing communicating with said jets.

20. In an apparatus of the class described, a solidifying receptacle, and means at one end thereof for introducing liquid gelatinous substances in the form of streamers, comprising a drum-like casing, a housing for said casing having a heating space surrounding the casing, a nozzle plate on the housing having a multiplicity of nozzle jets, and a multiplicity of openings in the top of the casing communicating with said jets, said casing being movably adjustable in said housing for varying the port area of the communication between said openings and said jets, and spring tension means for holding said casing flush with the underside of the nozzle plate.

21. The method of producing solidified globules from gelatinous substances, which consists in flowing the gelatinous substance into direct contact with a non-inflammable liquid solidifying medium having the inherent qualities of converting the substance into solidified globules.

22. The method of producing solidified globules from gelatinous substances, which consists in flowing the gelatinous substance in the form of relatively small streamers into the lower end of a vertically disposed receptacle, introducing a liquid solidifying medium into the same end of said receptacle and circulating it through the receptacle, removing the solidified globules of said gelatinous substance from the receptacle with said circulating solidifying medium and returning said solidifying medium to the receptacle after removing the solidified globules therefrom.

23. An apparatus for producing solidified globules from gelatinous substances, comprising a solidifying receptacle, a housing communicating with said receptacle, a conduit communicating with said housing for supplying gelatinous substances thereto, a plurality of small openings between said housing and said receptacle for introducing the liquid gelatinous substance into the receptacle in the form of streamers, and a liquid solidifying medium within said housing.

24. In an apparatus of the class described, a solidifying receptacle for containing a solidifying medium, and means at one end of said receptacle for introducing glue in gelatinous form into said receptacle and in the form of small streamers, comprising a casing having a plurality of openings in the top thereof communicating with said receptacle, a second casing within said first casing provided with a plurality of openings adapted to be aligned with the openings in the first casing, and means for moving the second casing relatively to the first casing to move said openings in the one casing out of alignment with those in the other casing and to thereby vary the effective size of the openings between the second casing and the receptacle.

25. A device as claimed in claim 24 in which the space between the two casings forms a chamber for the reception of a heating medium and in which a means is provided for introducing a heating medium into said chamber.

In testimony whereof I have signed my name to this specification on this 5 day of November, A. D. 1927.

THOMAS K. LOWRY.